(12) United States Patent
Nesler

(10) Patent No.: US 6,973,695 B1
(45) Date of Patent: Dec. 13, 2005

(54) APPARATUS FOR CLEANING OR OTHERWISE ENGAGING GLASS OR ANOTHER SURFACE AND METHOD FOR USING THE SAME

(76) Inventor: Todd G. Nesler, 2480 Doris, Brighton, MI (US) 48114

( * ) Notice: Subject to any disclaimer, the term of this patent is extended or adjusted under 35 U.S.C. 154(b) by 16 days.

(21) Appl. No.: 10/133,290

(22) Filed: Apr. 25, 2002

(51) Int. Cl.[7] .................................................. A47L 1/15

(52) U.S. Cl. .................. 15/220.1; 15/144.2; 15/144.4; 15/244.2; D32/40; D32/51

(58) Field of Search ........................... 15/144.2, 144.4, 15/220.1, 244.2, 228; D28/7; D32/40, 50, D32/51

(56) References Cited

U.S. PATENT DOCUMENTS

| | | | | |
|---|---|---|---|---|
| 3,123,946 A | * | 3/1964 | Hoveland | 451/522 |
| 3,778,860 A | * | 12/1973 | Thielen | 15/147.2 |
| 3,991,431 A | * | 11/1976 | Thielen | 15/147.2 |
| 5,333,347 A | * | 8/1994 | Stranders | 15/220.1 |
| 5,402,559 A | * | 4/1995 | Allison et al. | 15/228 |
| 5,419,015 A | * | 5/1995 | Garcia | 15/228 |
| 5,596,787 A | * | 1/1997 | Stevens et al. | 15/220.1 |
| 5,887,314 A | * | 3/1999 | Jordan, Jr. | 15/144.3 |
| D417,050 S | * | 11/1999 | Reede | D32/50 |
| 6,044,513 A | * | 4/2000 | Penn | 15/118 |
| 6,415,470 B1 | * | 7/2002 | Ramrattan | 15/144.4 |

* cited by examiner

Primary Examiner—Randall Chin
(74) Attorney, Agent, or Firm—Law Offices of John Chupa & Associates, P.C.

(57) ABSTRACT

A device or cleaning apparatus 10 which includes a telescoping shaft member 8 and a universal joint assembly 40 and which allows a user to easily and ergonomically clean or otherwise engage an angled or curved glass surface or another surface.

17 Claims, 6 Drawing Sheets

APPARATUS FOR CLEANING OR OTHERWISE ENGAGING GLASS OR ANOTHER SURFACE AND METHOD FOR USING THE SAME

FIELD OF THE INVENTION

This invention relates to a method and an apparatus for cleaning or otherwise engaging glass or another surface and more particularly, to an apparatus which utilizes a telescoping shaft and a universal joint to pivotally move a cleaning element or other element in relation to the angle of the glass or other surface and to allow a user to easily and ergonomically apply a force to the glass or other surface, thereby cleaning or otherwise engaging the glass or other surface.

BACKGROUND OF THE INVENTION

Conventional cleaning or engaging equipment is oftentimes built in a manner that does not always provide an easy and convenient method for a user to clean or otherwise engage a particular object or surface. Particularly, this conventional equipment is either too rigid, too big, or just too difficult to adapt or conform to certain attributes of the object or surface, such as the shape or location of the object or surface.

For example and without limitation, angled or curved glass surfaces, such as those contained within an automobile or a delicatessen counter, are oftentimes extremely difficult to clean because conventional cleaning equipment does not properly adapt or conform to the specific angle or curve of the surfaces. Particularly, a user must either reach or stretch in an uncomfortable manner in order to clean these types of glass. Moreover, because of the distance and awkwardness of the glass or surface, a user is unable to properly apply a force which is adequate to clean the glass or other surface.

Furthermore, because of the distance and awkwardness of the glass or surface and because of the angle of the glass or surface (e.g., an angle which is created between such objects as a dashboard within an automobile and the slope or angle of the windshield), a user is unable to negotiate the rather acute angle with his/her hands or apply a cleaning solution to only one of the desired surfaces (e.g., a conventional spray bottle containing a cleaning solution specifically designed for cleaning a glass surface typically will allow a portion of the spray or mist to coat or drip upon the dashboard surface). For example and without limitation, while cleaning the underside portion of a delicatessen "sneeze-guard" or glass covering (i.e., the surface which typically forms an acute angle with the surface which holds or contains the delicatessen food items), it is particularly undesirable to allow any dripping or "over-spray" of a cleaning solution to occur in order to maintain a non-contaminated food containing area.

More specifically, conventional cleaning equipment devices use long non-flexible shafts which make it extremely difficult to maneuver in tight or narrow areas, such as within an automobile or behind a delicatessen counter. Moreover, a user in these tight or narrow areas cannot apply a sufficient amount to force to clean a particular glass surface, such as an automotive windshield or a glass surface within a delicatessen counter.

Likewise, conventional engaging equipment devices use long non-flexible shafts which make it extremely difficult to maneuver in "out-of-reach" areas, such as the roof or hood portion of an automobile or conventional exterior shudders of a typical house. Moreover, a user in these "out-of-reach" areas cannot apply a sufficient amount to force to engage a particular surface, such as the roof or hood portion of an automobile or conventional exterior shudders of a typical house.

Furthermore, conventional cleaning equipment devices make it extremely difficult to avoid dripping or "over-spray" of a cleaning solution upon an undesired surface while cleaning a narrow or "hard to reach" surface.

There is therefore a need for a method and an apparatus to easily and ergonomically apply a force to clean or otherwise engage an angled glass surface or another surface and which overcomes some or all of the previously delineated drawbacks of the prior art.

SUMMARY OF THE INVENTION

A first non-limiting advantage of the invention is that it provides a method and apparatus for easily and ergonomically cleaning angled glass or another surface which is adapted to overcome some or all of the previously delineated drawbacks of the prior art.

A second non-limiting advantage of the invention is that it provides a method and apparatus for cleaning glass or another surface which utilizes a universal joint which is capable of rotating in all directions and which allows a user to easily clean an angled glass surface.

A third non-limiting advantage of the invention is that it provides a method and apparatus for cleaning glass or another surface which utilizes a telescoping shaft which adjusts to a desired distance to allow a user to easily and ergonomically apply sufficient force to clean a particular glass surface.

A fourth non-limiting advantage of the invention is that it provides a method and apparatus for cleaning glass or another surface which utilizes various types of head shapes to allow a user to clean the "hard to reach" corners on angled or curved glass surfaces.

A fifth non-limiting advantage of the invention is that it provides a method and an apparatus for cleaning glass or another surface which utilizes a generally triangular shaped telescoping shaft having at least one locking mechanism which allows the telescoping shaft to be adjusted to a plurality of fixed lengths and which utilizes various types of head shapes to allow a user to clean the "hard to reach" corners on angled or curved glass or other surfaces.

A sixth non-limiting advantage of the present invention is that it provides a method and an apparatus for cleaning glass or another surface which utilizes at least one selectively adjustable "O-ring" which is disposed within at least one pivot point between the various types of heads and the telescoping shaft and which allows a user to selectively adjust the friction coefficient between the various types of heads and the telescoping shaft.

A seventh non-limiting advantage of the present invention is that it provides a method and an apparatus for cleaning glass or another surface which utilizes at least one selectively removable cloth which may be selectively and removably attached to the various types of heads and which allows a user to clean glass or another surface and engage a plurality of surfaces with the at least one selectively removable cloth without damaging the plurality of surfaces.

According to the first aspect of the invention, an apparatus for cleaning a glass surface or another surface is provided. The apparatus comprises of: a shaft member; a yoke member which is coupled to the shaft member; a head member; a cleaning member which is removably coupled to the head portion; and a universal joint portion which is pivotally coupled to the yoke member and the head member and which allows the head member to be rotatably movable relative to the yoke member.

According to the second aspect of the invention, an apparatus for cleaning a glass surface is provided. The apparatus comprises: a telescoping shaft member; a yoke member which is coupled to the shaft member; a head member which has a first surface having an adhesive material; a universal joint portion which is pivotally coupled to the yoke member and the head member; and a cleaning element which is selectively and removably coupled to the head member.

According to a third aspect of the invention, a method for engaging a certain surface is provided. The method comprises the steps of: providing a telescoping shaft member having an upper telescoping portion and at least one lower telescoping portion; providing a head member; attaching said head member to said shaft member by use of a universal joint; providing an engaging element; applying an adhesive material to said head member; removably attaching said engaging element to said head member; and causing said engaging element to contact said certain surface.

Further objects, features and advantages of the present invention will become apparent from a consideration of the following description and appended claims when taken in conjunction with the accompanied drawings.

DETAILED DESCRIPTION OF THE INVENTION

Figure 1:
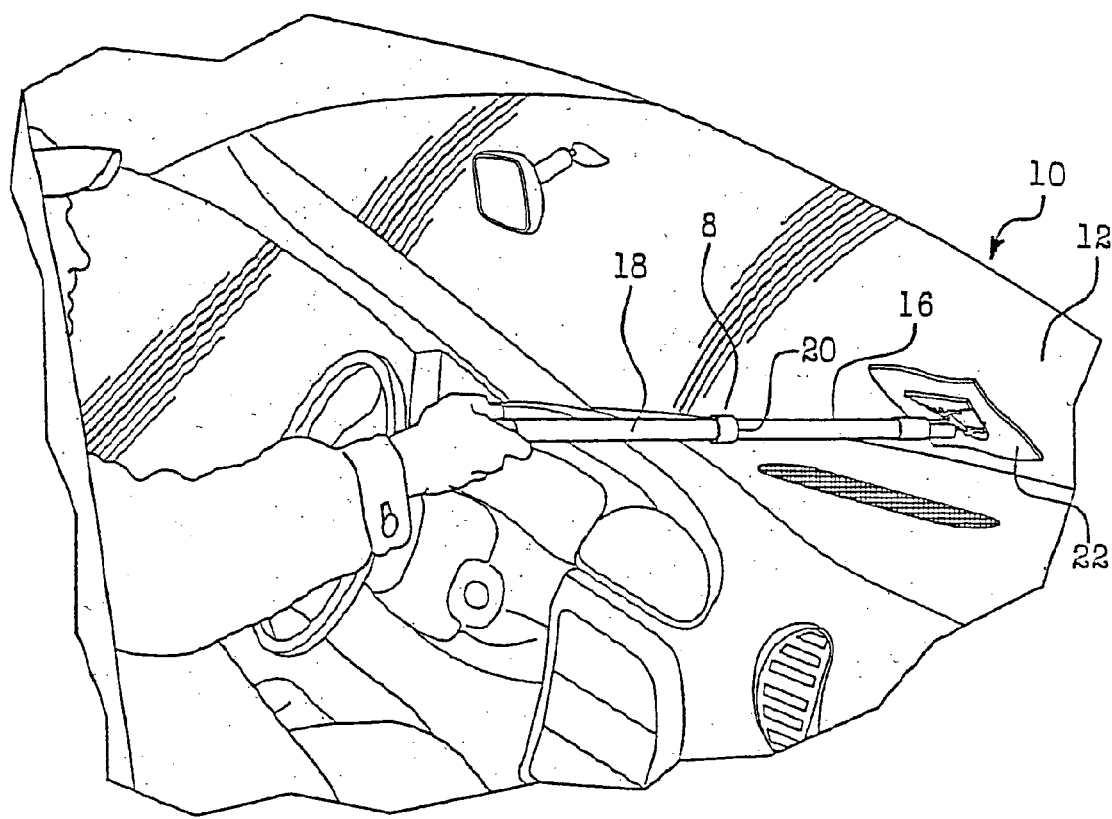
FIG. 1 is a perspective view of a glass cleaning device which is made in accordance with the teachings of the preferred embodiment of this invention and which is being used to clean a vehicle windshield.
Figure 2:
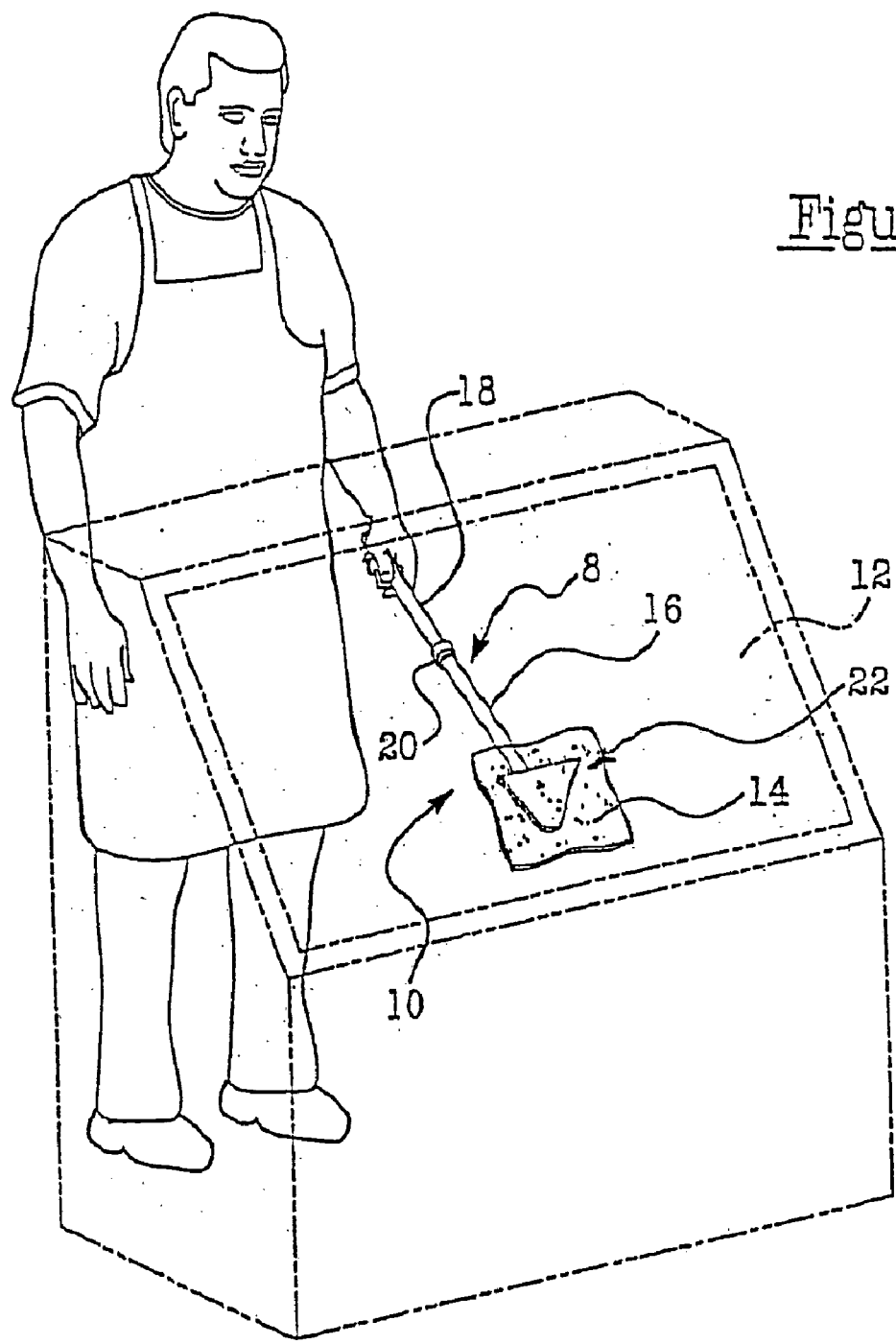
FIG. 2 is a perspective view of the glass cleaning device being used to clean a delicatessen counter.

Referring now to FIGS. 1–6a–c, there is shown an cleaning assembly or apparatus 10 which allows a user to clean an angled and/or curved glass surface 12 and which is made in accordance with the teachings of the preferred embodiment of the invention. Glass surface 12 may be any type of glass surface. In FIG. 1, the glass surface 12 being cleaned is a vehicle windshield. In FIG. 2, the glass surface 12 is an angled delicatessen counter. As shown, cleaning assembly 10 includes a telescoping shaft assembly 8, a head member 22, a universal joint assembly 40 which rotatably couples head member 22 to shaft assembly 8 and a cleaning element 14.

At the outset, it should be understood that nothing in this description is meant to limit the surface on which cleaning assembly 10 may be utilized to a particular surface. Rather, cleaning assembly 10 may be utilized on substantially any desired surface. Furthermore, nothing in this description is meant to limit cleaning assembly 10 to only be utilized as a cleaning assembly. Rather, cleaning substantially any desired surface is but one of a plurality of applications for which cleaning assembly 10 may be utilized. For example and without limitation, cleaning assembly 10 may be utilized to perform such duties as polishing or buffing substantially any desired surface, "sanding" or removing a material from substantially any desired surface, or performing substantially any desired duty or application which may benefit from utilizing the various amenities of cleaning assembly 10 which will be discussed in greater detail below.

In the preferred embodiment of the invention, the telescoping shaft assembly 8 includes an upper shaft portion or member 18, a lower shaft portion or member 16, and a rotational locking member 20. Telescoping shaft assembly 8 is made of a lightweight, strong and durable material which is capable of withstanding a force produced by a user in order to clean a glass surface 12.

Figure 4:
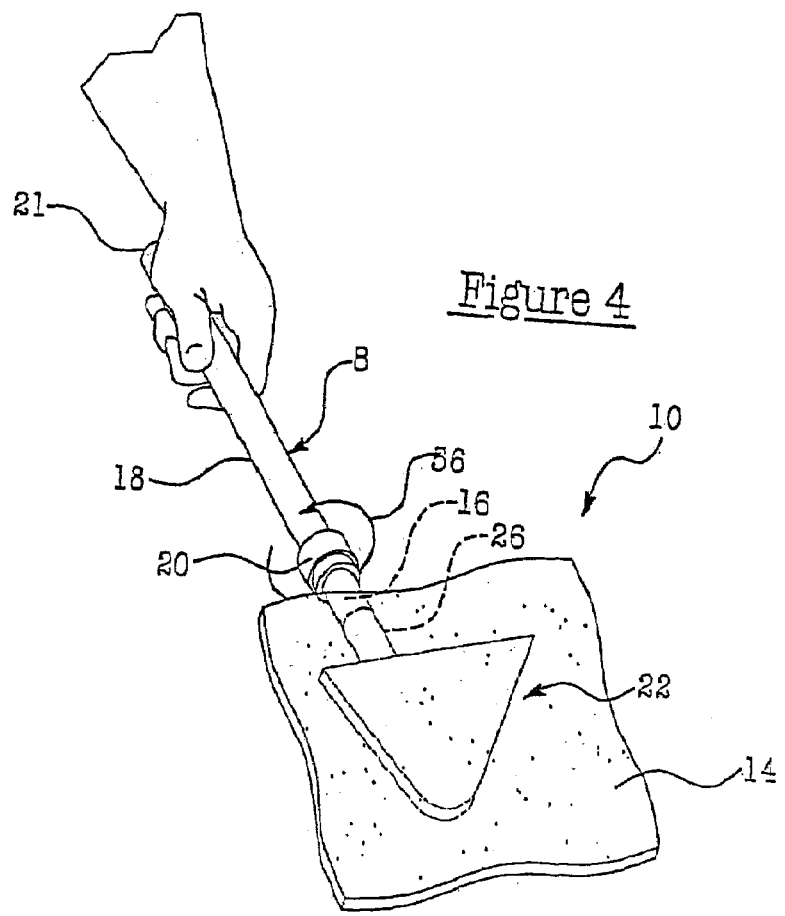
FIG. 4 is a perspective view of the device shown in FIG. 1 which illustrates the rotatable locking mechanism on the telescoping shaft being loosened.
Figure 5:
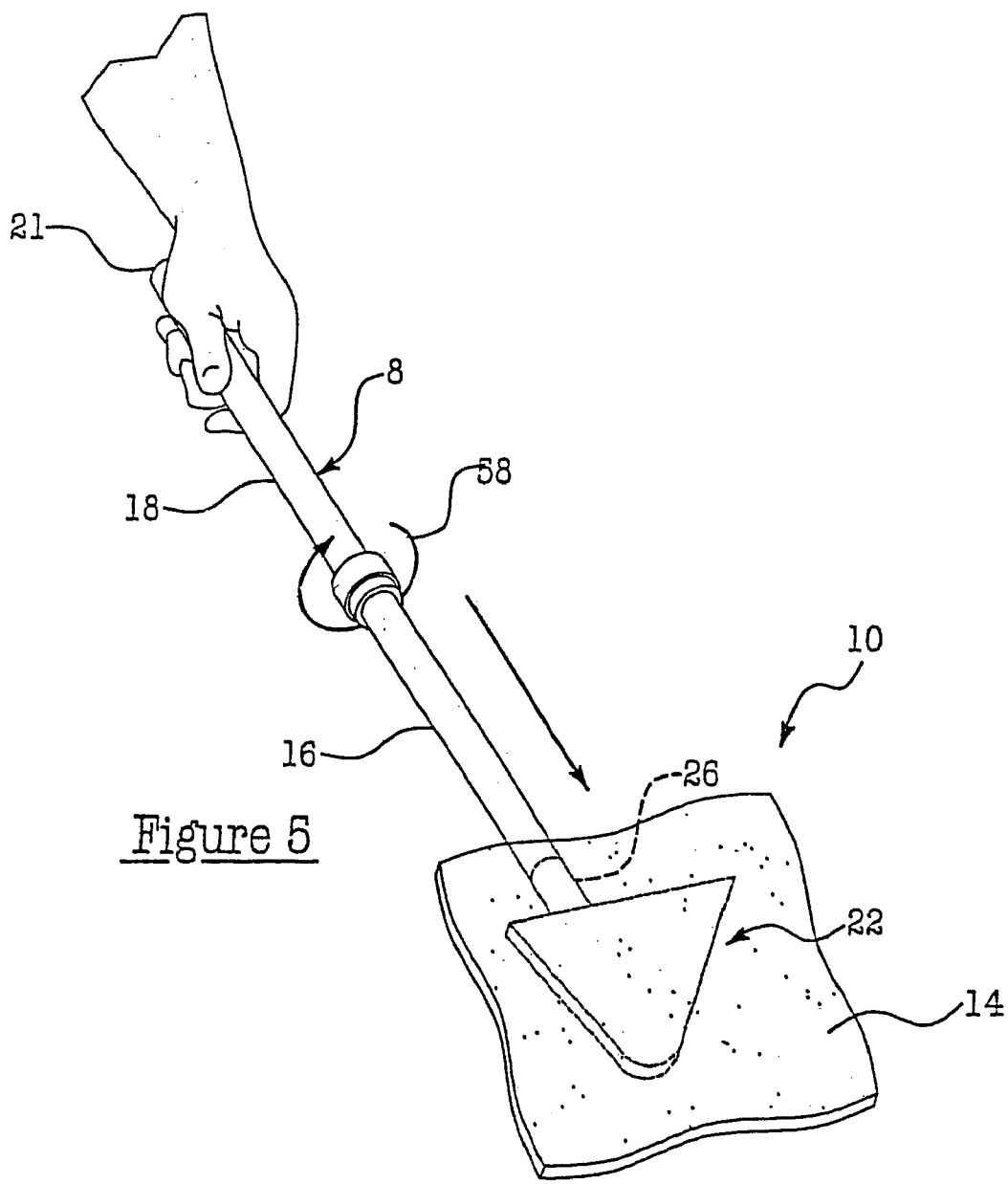
FIG. 5 is a perspective view of the device shown in FIG. 1 which illustrates the rotatable locking mechanism on the telescoping shaft being tightened after the shaft has been extended.

As best shown in FIGS. 4 and 5, upper shaft portion 18 is generally tubular and hollow. Lower shaft portion 16 is also generally tubular and has a smaller diameter than upper shaft portion 18. Lower shaft portion 16 telescopingly engages upper shaft portion 18 and is slidable in an out of upper shaft portion 18, thereby allowing shaft assembly 8 to be selectively adjusted to a desired length. Locking member 20 is a conventional rotatable locking mechanism which is rotatably coupled to upper shaft portion 18 and to lower shaft portion 16. Locking member 20 is effective to selectively secure lower shaft portion 16 relative to upper shaft portion 18. Particularly, by rotating locking mechanism 20 in the clockwise direction 58, locking mechanism 20 frictionally engages lower shaft portion 16, thereby preventing lower shaft portion 16 from moving relative to upper shaft portion 18. In one non-limiting embodiment of the invention, a top end 21 of upper shaft portion 18 includes an outer handle portion which is either integrally formed with the upper shaft portion 18 or is a separate rubber or plastic handle portion which may be slid over the top end of upper shaft portion 18. In an alternate embodiment of the invention, shaft assembly 8 may comprise a conventional non-telescoping shaft which in one non-limiting embodiment may be made of wood.

In yet another alternate embodiment of the invention, the telescoping shaft assembly 8 may include a generally triangular shaped upper shaft portion or member (not shown), at least one generally triangular shaped lower shaft portion or member (not shown), and at least one conventional locking clasp member (not shown). The upper shaft portion, in this alternate embodiment, may be generally hollow and triangular shaped. The at least one lower shaft portion may be generally hollow and triangular shaped and have a smaller outer periphery than the inner periphery of the generally hollow upper shaft portion. The at least one lower shaft portion telescopingly engages the upper shaft portion and is slidable in an out of upper shaft portion, thereby allowing shaft assembly 8 to be selectively adjusted to a desired length. The at least one conventional locking clasp member is a conventional locking mechanism which is claspably coupled to the upper shaft portion and to the lower shaft portion. The at least one locking clasp member is effective to selectively secure the at least one lower shaft portion relative to the upper shaft portion. Particularly, by clasping or locking the at least one locking clasp member in a conventional manner, the locking clasp member frictionally engages the lower shaft portion, thereby preventing the at least one lower shaft portion from moving relative to the upper shaft portion. It should be appreciated that the generally triangular shape of the telescoping shaft assembly 8, in this alternate embodiment, substantially prevents or obviates unwanted or undesirable rotational movement of the shaft assembly 8 within the hand(s) of a user.

In yet another non-limiting embodiment, head member 22 includes a generally hollow and tubular portion which selectively and removably couples to the telescoping shaft assembly 8 in a conventional manner. For example and without limitation, head member 22 and telescoping shaft assembly 8 may include male and female thread engagement members which frictionally, removably, and threadingly couple the head member 22 to the telescoping shaft assembly 8. It should be appreciated that in this alternate embodiment, the shape of the telescoping shaft assembly 8 may be substantially tubular or generally triangular. It should be further appreciated that the generally triangular shaped telescoping shaft assembly 8 will substantially prevent axial movement of the shaft assembly relative to the head assembly. That is, the generally triangular shape of the telescoping shaft assembly 8, as discussed above, will substantially prevent rotational movement of the shaft assembly 8 within the hands of a user thereby substantially preventing axial movement between the head member 22 and the shaft assembly 8, which substantially prevents the male and female thread engagement from breaking loose or becoming uncoupled.

Head member 22 includes a relatively flat portion 60 and two raised portions 62 which are integrally formed with flat portion 60. Head member 22 is made of a lightweight, strong and durable material. In one non-limiting embodiment of the invention head member 22 will be generally triangular shaped to easily reach and maneuver in and around the "hard to reach" corners of glass surface 12. That is, the generally triangular shape of head member 22, in this alternate embodiment, may comprise a substantially different acute angle on two of the respective corners of the generally triangular shaped head member 22 (e.g., one corner of the generally triangular shaped head member 22 may comprise an acute angle of approximately 50–70 degrees and the remaining corner of the generally triangular shaped head member 22 may comprise an acute angle of approximately 20–40 degrees), effective to allow an individual to clean or otherwise engage a plurality of different angles upon a glass surface or another surface. Furthermore, the remaining third corner of the generally triangular shaped head member 22 may comprise a rounded or curved "corner" effective to allow an individual to clean or otherwise engage a rounded or curved glass surface or another surface. In another non-limiting embodiment head member 22 will be generally circular. In yet another alternate embodiment of the invention, head member 22 may comprise a conventional ice scraper assembly. Head member 22 further includes an adhesive material 24 which is removably coupled to the flat portion 60 of head member 22. In one non-limiting embodiment of the invention, adhesive material 24 is a "Velcro"-like substance.

It should be understood that nothing in this description is meant to limit the size of the head member 22 to the size which is illustrated in FIGS. 1–6C. Rather, the general size which is illustrated in these Figures is for illustrative purposes only and one who is skilled in the art should appreciate that the size of head member 22 may be substantially reduced or substantially increased. For example and without limitation, head member 22 may be reduced to a size which may be utilized to clean or otherwise engage substantially small surfaces, surfaces such as laser housing surfaces within a compact disc system, a LED display on a cellular telephone, or the surfaces within an automobile which may require a relatively small engagement tool in order to perform such tasks as "detailing".

Cleaning element 14 is selectively and removably coupled to head member 22 by use of an adhesive material 24, such as a "Velcro"-like substance. In one non-limiting embodiment of the invention, cleaning element 14 comprises a cloth or rag material which allows a user to clean an angled glass surface 12. In another non-limiting embodiment of the invention, cleaning element 14 will include a sponge-like material which allows a user to easily clean a curved glass surface. In yet another non-limiting embodiment, cleaning element 14 will include a "terrycloth"-like material which allows a user to easily "wax" or "buff" a curved or flat surface. In yet another non-limiting embodiment, cleaning element 14 will include a "sandpaper"-like material which allows a user to easily "sand" or remove a material from a curved or flat surface. In yet another non-limiting embodiment, cleaning or otherwise engaging element 14 may include an elastic like material and be shaped to conformingly receive head member 22, effective to securingly and removably attach cleaning or otherwise engaging element 14 to the head member 22.

Universal joint 40 is, in one non-limiting embodiment, a conventional and commercially available universal joint and respectively includes a yoke member 26, cross member 28 and a hinge pin member 30. Yoke member 26 is threadingly coupled to the lower shaft portion 16 of telescoping shaft member 8. Yoke member 26 further comprises a "Y"-shaped or "forked" portion 32. Forked portion 32 has apertures 64 on each "prong" through which hinge pin member 30 passes. Cross member 28 includes a portion which has a single aperture 66 through which hinge pin 30 passes. The portion of cross member 28 including aperture 66 has a width that is less than the width between the prongs of forked portion 32, thereby allowing yoke member 26 to rotate in relation to cross member 28. Yoke member 26 is coupled to cross member 28 by the use of hinge pin member 30 which passes through the apertures 64 in forked portion 32 and aperture 66 in cross member 28, and is effective to allow head member 22 to rotate, relative to shaft assembly 8, in directions 50. Cross member 28 is further removably coupled to for clarity raised portions 62 of the head member 22 by an attaching pin member 34. Attaching pin member 34 is capable of being depressed in a manner which allows head member 22 to be selectively removed from the cross member 28.

In one non-limiting embodiment of the invention, the universal joint 40 may include at least one selectively adjustable and compressible material, such as a selectively adjustable "O-ring", which allows a user to selectively adjust the force applied to the friction coefficient between the head member 22 and the shaft assembly 8. The at least one selectively adjustable material or "O-ring" may comprise substantially any desired and commercially available and adjustable "O-ring" assembly. It should be appreciated that by incorporating at least one selectively adjustable material or "O-ring" assembly within the universal joint 40, the frictional relationship between the head member 22 and the shaft assembly 8 of cleaning apparatus 10 will be substantially lengthened (i.e., the at least one selectively adjustable "O-ring" substantially obviates the potentiality that the frictional coefficient between the head member 20 and the shaft assembly 8 may become (dependent upon time and frequency of usage) less than desired, thereby resulting in insufficient rigidity between the head member 22 and the shaft member 8).

In operation, assembly 10 is used to easily and ergonomically apply a force to clean a glass surface 12. As best shown in FIGS. 4 and 5, telescoping shaft assembly 8 is extended to a desired length by first rotating locking member 20 in a counterclockwise direction 56. This rotation causes locking member 20 to loosen and release lower shaft portion 16. Lower shaft portion 16 is then extended from upper shaft portion 18 to the desired length. Locking member 20 is then rotated in a clockwise direction 58 which frictionally secures lower shaft portion 16 in the extended position. By extending lower shaft portion 16, a user is capable of reaching a particular glass surface which would otherwise be difficult and which also allows a user to apply a force to the shaft assembly 8 to properly and efficiently clean a glass surface.

Figure 3:
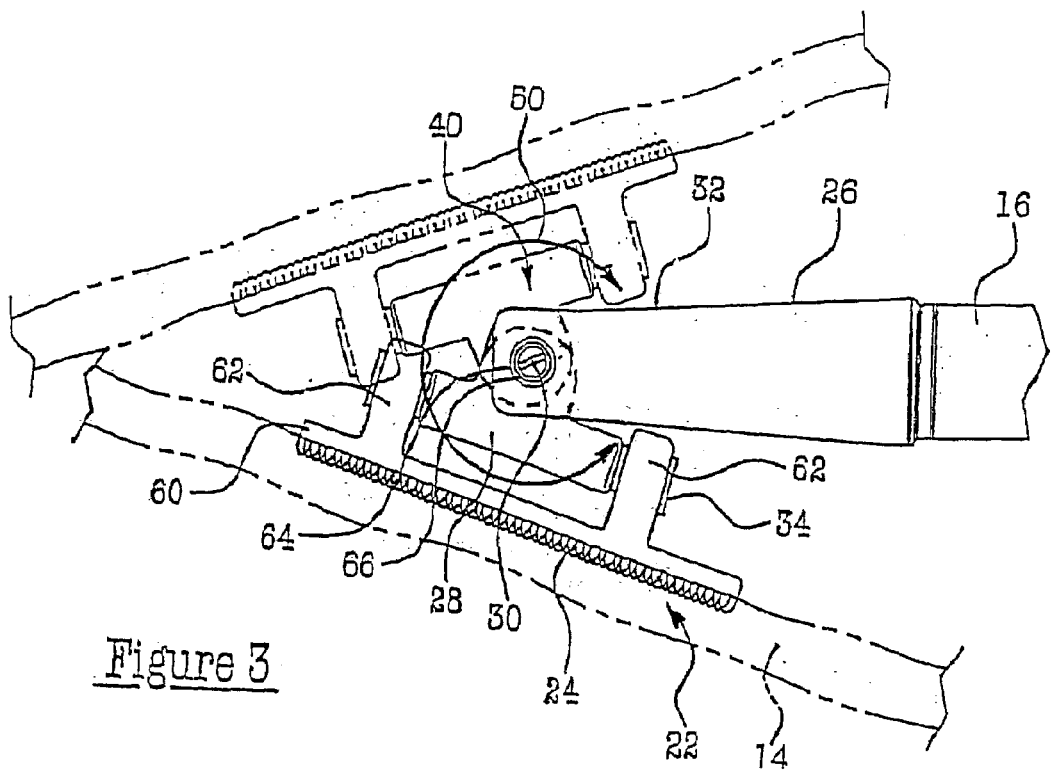
FIG. 3 is a side view of the device in FIG. 1 which illustrates the pivotal direction of the universal joint.

As shown best in FIG. 3, lower shaft portion 16 is frictionally or threadingly coupled to yoke member 26 of universal joint assembly 40. Yoke member 26 has a "Y" or forked shaped portion 32, which is shown best in FIGS. 6a–6c, and which is coupled to cross member 28 by sliding hinge pin member 30 through the apertures in forked portion 32 and cross member 28. It should be appreciated that a plurality of differently shaped yoke members may also be utilized. Universal joint assembly 40 rotatably couples shaft assembly 8 to head member 22. Universal joint assembly 40 allows for the head member 22 to rotate or flex, relative to shaft assembly 8, in the direction 50, as shown best in FIG. 3 (i.e., cross member 28 rotates in directions 50 relative to yoke member 26 by rotating around hinge pin member 30).

Figure 6A:
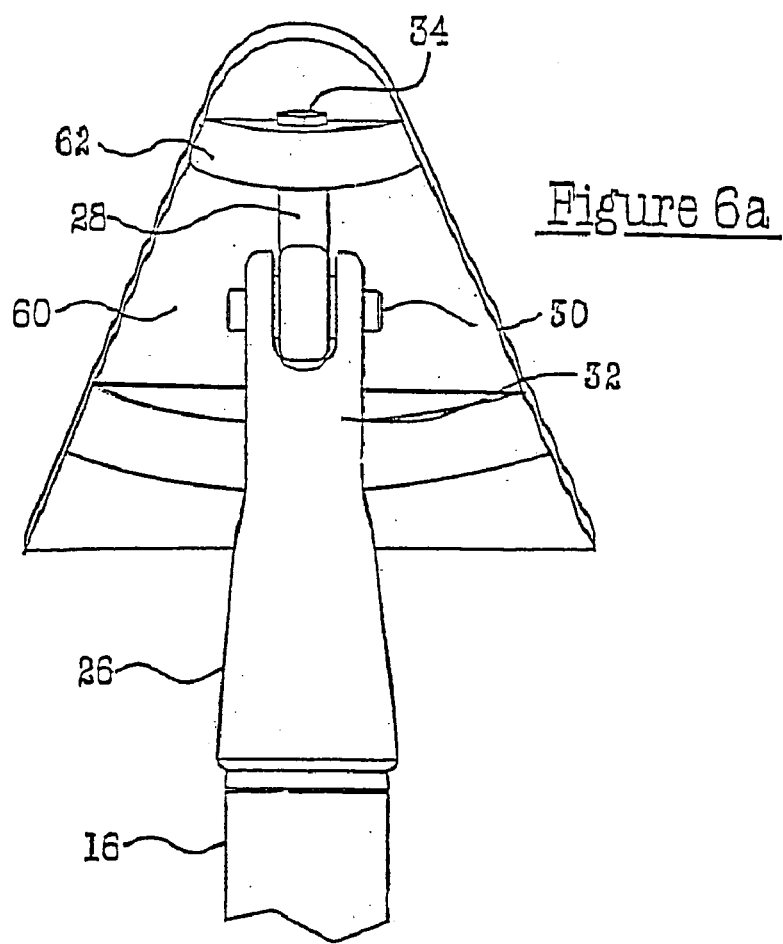
FIG. 6a is a back view of the device shown in FIG. 1.
Figure 6B:
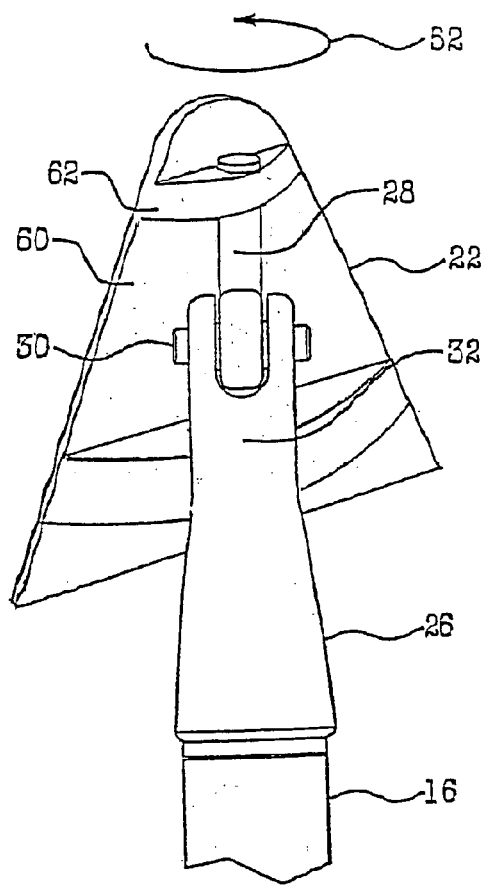
FIG. 6b is a perspective view of the device shown in FIG. 1 which illustrates the device being rotated in a counter-clockwise direction.
Figure 6C:
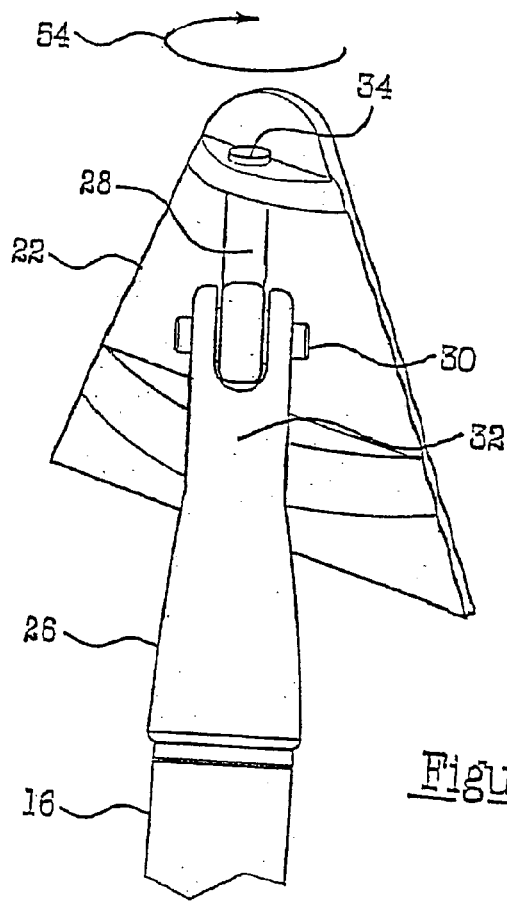
FIG. 6c is a perspective view of the device shown in FIG. 1 which illustrates the device being rotated in a clockwise direction.

As best shown in FIGS. 6a–6c, universal joint assembly 40 also allows head member 22 to be rotated in both a clockwise direction 52 (FIG. 6b) and a counterclockwise direction 54 (FIG. 6c) in relation to shaft assembly 8. Because head member 22 is able to rotate in all directions relative to shaft assembly 8 by the use of universal joint assembly 40, head member 22 is able to adjust or conform to virtually all contoured surfaces (e.g., angled or curved). More particularly, coupling the head member 22 to a telescoping shaft assembly 8, by the use of a universal joint assembly 40, a user is able to apply a proper force to a cleaning element 14 which flexibly conforms to virtually any type of surface.

To further assist a user in cleaning or engaging a particular surface (e.g., angled or curved) head member 22 can be easily removed and replaced with a different head member 22 which is designed for a particular surface or glass or shape of surface or shape of glass. As shown best in FIGS. 3 and 6a–6c, head member 22 is removably coupled to cross member 28 by an attaching pin member 34. By releasing or depressing attaching pin member 34, head member 22 may be removed and a different head member 22 may be attached. It should be understood that other types of engagement/releasing mechanisms may be employed to facilitate the removability of the head member 22 from the shaft assembly 8. For example and without limitation, the attaching pin member may be replaced by a conventional "quick-release" assembly which utilizes a selectively depressible button or switch in order to engage/disengage the "quick-release" mechanism. This gives a user the ability to easily change head members and to easily clean various surfaces (e.g., angled or curved surface or glass). For example and without limitation, using a triangular head member 22, a user is capable of cleaning the "hard to reach" corners of an angled surface or an angled glass surface, such as an automotive windshield, a glass surface on a delicatessen counter, a display unit with a curved or angled glass surface, or an angled or curved exterior surface of an automobile or home. In an alternate embodiment of the invention, head member 22 may include other shapes, such as square, polygonal or circular to adapt to the particular shape of the surface to be cleaned or otherwise engaged. The telescoping shaft 8 of assembly 10 allows the assembly 10 to be selectively shortened for convenient storage within an automotive vehicle or other location. Furthermore, by extending the shaft 8, a user may clean all glass surfaces within a vehicle from a single location. For example and without limitation, a user may conveniently clean both surfaces (i.e., interior and exterior) of an automobile windshield from a location remote from the interior of the automobile. That is, a user may desire to clean the interior surface of an automobile windshield immediately after cleaning the exterior surface of the same windshield without having to physically crawl into the automobile.

A particular cleaning element 14 is chosen to clean a particular surface and is removably attached to head member 22. As best shown in FIG. 3, head member 22 has an adhesive material 24 which is removably attached. Cleaning element 14 is removably attached to the head member 22 through the use of the removably attached adhesive material 24. Adhesive material 24 secures cleaning element 14 to head member 22 while a user cleans or otherwise engages a glass surface 12 or another surface. It should be appreciated that, in this manner, a user may selectively spray a cleaning solution or another solution upon cleaning element 14 effective to substantially obviate undesirable dripping resulting from spraying a cleaning element directly upon the desired surface.

What is claimed is:

1. An apparatus for cleaning a glass surface, said apparatus comprising of:
   a shaft member;
   a yoke member which is coupled to said shaft member;
   a head member;
   a cleaning member which is removably coupled to said head member; and
   a universal joint portion which is pivotally coupled to said yoke member and said head member and which allows said head member to be rotatably movable relative to said yoke member, wherein said head member includes a flat portion and two raised portions which are integrally formed with said flat portion and wherein said head member has a first corner which forms an acute angle of about fifty to about seventy degrees, a second corner which forms an acute angle of about twenty to about forty degrees, and a third corner which is generally circular.

2. The apparatus in claim 1 wherein said head member is generally triangular.

3. The apparatus in claim 1 wherein said universal joint portion further includes at least one selectively adjustable O ring assembly.

4. The apparatus in claim 1 wherein said shaft member is a selectively extendable telescoping shaft.

5. The shaft member in claim 4 wherein said shaft member comprises a rotatable locking mechanism.

6. The apparatus in claim 1 wherein said head member comprises an adhesive material on which said cleaning member is removably attached.

7. The adhesive material in claim 6 wherein said material comprises a hook and loop type assembly.

8. An apparatus for cleaning glass using a pivotal joint, said apparatus comprising of:
- a telescoping shaft member;
- a yoke member coupled to said shaft member;
- a head member which has a first surface having an adhesive material;
- a universal joint portion which is pivotally coupled to said yoke member and said head member; and
- a cleaning element which is selectively and removably coupled to said head member, and wherein said head member includes a flat portion and two raised portions which are integrally formed with said flat portion and wherein said head member has a first corner which forms an acute angle of about fifty to about seventy degrees, a second corner which forms an acute angle of about twenty to about forty degrees, and a third corner which is generally circular.

9. The apparatus in claim 8 wherein said head member is generally triangular.

10. The apparatus in claim 8 wherein said universal joint portion further includes at least one selectively adjustable O ring assembly.

11. The apparatus in claim 8 wherein said head member is further comprised of a foam material which is effective to conformingly engage a curved glass surface.

12. The apparatus in claim 8 wherein said shaft member is a selectively extendable telescoping shaft.

13. The shaft member in claim 12 wherein said shaft member further includes an upper and lower portion.

14. The shaft member in claim 12 wherein said shaft member comprises at least one locking mechanism.

15. The apparatus in claim 8 wherein said shaft member is threadingly coupled to said yoke member.

16. The apparatus in claim 8 wherein said universal joint portion further includes a cross member and a hinge pin.

17. The apparatus in claim 8 wherein said adhesive material is a hook and loop type assembly.

* * * * *